US011777620B2

(12) United States Patent
Sunila et al.

(10) Patent No.: US 11,777,620 B2
(45) Date of Patent: Oct. 3, 2023

(54) HANDLING VSWR VALUE OR THE LIKE OF ANTENNAS IN TELECOMMUNICATION NETWORKS

(71) Applicant: Elisa Oyj, Helsinki (FI)

(72) Inventors: Karri Sunila, Helsinki (FI); Antti Salmenlinna, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 17/921,533

(22) PCT Filed: Apr. 21, 2021

(86) PCT No.: PCT/FI2021/050304

§ 371 (c)(1),
(2) Date: Oct. 26, 2022

(87) PCT Pub. No.: WO2021/219929

PCT Pub. Date: Nov. 4, 2021

(65) Prior Publication Data

US 2023/0117138 A1 Apr. 20, 2023

(30) Foreign Application Priority Data

Apr. 29, 2020 (FI) .................................... 20205437

(51) Int. Cl.
*H04B 7/00* (2006.01)
*H04B 17/15* (2015.01)
*H04B 17/10* (2015.01)

(52) U.S. Cl.
CPC ........... *H04B 17/15* (2015.01); *H04B 17/104* (2015.01)

(58) Field of Classification Search
CPC ........ H04B 17/18; H04B 17/15; H04B 17/16; H04B 17/17; H04B 17/19; H04B 17/104; H04B 17/101
See application file for complete search history.

(56) References Cited

U.S. PATENT DOCUMENTS 7,499,691 B1 * 3/2009 Dunn .................. H04B 7/0814 455/101
2004/0121742 A1 * 6/2004 Abrams ............... H04B 1/0466 455/91

(Continued)

FOREIGN PATENT DOCUMENTS

CN 106411550 A 2/2017
JP 2004096689 A 3/2004

(Continued)

OTHER PUBLICATIONS

Corp Anritsu, "Understanding Cable & Antenna Analysis", pp. 1-74, XP055736951, Aug. 1, 2013, 75 pages.

(Continued)

*Primary Examiner* — Nhan T Le
(74) *Attorney, Agent, or Firm* — ZIEGLER IP LAW GROUP, LLC

(57) ABSTRACT

A computer implemented method of handling threshold value of an antenna performance parameter of an antenna of a telecommunication network. A default antenna performance parameter threshold value of the antenna is obtained; a second antenna performance parameter threshold value for the antenna is determined based on the default antenna performance parameter threshold value and loss information related to the antenna, or based on gradually testing antenna performance parameter threshold values; and the second antenna performance parameter threshold value is taken into use for the antenna.

9 Claims, 3 Drawing Sheets

(56) References Cited

U.S. PATENT DOCUMENTS

| | | | | |
|---|---|---|---|---|
| 2008/0309555 | A1 | 12/2008 | Fan et al. | |
| 2015/0318610 | A1 | 11/2015 | Lee et al. | |
| 2017/0126288 | A1 | 5/2017 | Sandhu et al. | |
| 2021/0250105 | A1* | 8/2021 | Wang | H04B 17/103 |

FOREIGN PATENT DOCUMENTS

| | | | |
|---|---|---|---|
| WO | 2019205003 | A1 | 10/2019 |
| WO | 2020038833 | A1 | 2/2020 |

OTHER PUBLICATIONS

Finnish Patent and Registration Office, Search Report, Application No. 20205437, dated Dec. 23, 2020, 2 pages.
Meyer Lou, "A Tool for Calculating RF Path Return Loss, CommScope", pp. 1-3, XP055909587, Jan. 1, 2017, 6 pages.
Notification of Transmittal of The International Preliminary Reporton Patentability, Application No. PCT/FI2021/050304, dated Aug. 9, 2022, 19 pages.
Notification of Transmittal of The International Search Report and The Written Opinion of The International Searching Authority, or The Declaration, Application No. PCT/FI2021/050304, dated Jul. 7, 2021, 16 pages.

* cited by examiner

HANDLING VSWR VALUE OR THE LIKE OF ANTENNAS IN TELECOMMUNICATION NETWORKS

TECHNICAL FIELD

The present application generally relates to handling VSWR value, or the like, of antennas in telecommunication networks.

BACKGROUND

This section illustrates useful background information without admission of any technique described herein representative of the state of the art.

Voltage Standing Wave Ratio, VSWR, is an indication of the amount of mismatch between an antenna and a feed line connecting to it. The range of values for VSWR is from 1 to ∞.

VSWR is a parameter that can be used for monitoring antenna performance in telecommunication networks. Antenna manufacturers provide default thresholds for antennas. If it is detected that the default threshold is triggered, there is likely a problem with performance of the antenna.

SUMMARY

Various aspects of examples of the invention are set out in the claims. Any devices and/or methods in the description and/or drawings which are not covered by the claims are examples useful for understanding the invention.

According to a first example aspect of the present invention, there is provided a computer implemented method of handling threshold value of an antenna performance parameter of an antenna of a telecommunication network. The method comprises

- obtaining a default antenna performance parameter threshold value of the antenna;
- determining a second antenna performance parameter threshold value for the antenna based on the default antenna performance parameter threshold value and loss information related to the antenna, or based on gradually testing antenna performance parameter threshold values; and
- taking the second antenna performance parameter threshold value into use for the antenna.

In an example embodiment, the loss information is obtained from a documentation system.

In an example embodiment, the loss information comprises information about cable losses and/or connector losses.

In an example embodiment, gradual testing of the antenna performance parameter threshold values comprises

- setting the antenna performance parameter threshold value of the antenna to an initial value;
- gradually changing the antenna performance parameter threshold value until an antenna performance parameter alarm is triggered or no longer triggered to find out a triggering antenna performance parameter threshold value; and
- determining the second antenna performance parameter threshold value based on the triggering antenna performance parameter threshold value and a predefined margin.

In an example embodiment, the method further comprises determining experienced loss related to the antenna based on the default antenna performance parameter threshold value of the antenna and the triggering antenna performance parameter threshold value.

In an example embodiment, the method further comprises using the determined experienced loss to check validity of loss information in a documentation system.

In an example embodiment, the antenna performance parameter is Voltage Standing Wave Ratio, VSWR, parameter.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present invention have been illustrated in the foregoing paragraphs. The embodiments in the foregoing paragraphs are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 4 of the drawings. In this document, like reference signs denote like parts or steps.

Example embodiments of the invention provide new mechanisms to handle threshold values of an antenna performance parameter, such as VSWR, in telecommunication networks. More specifically, example embodiments provide adjusting threshold values of the antenna performance parameter. In this way, the threshold can be individually determined for each antenna instead of using a default value. The antenna performance parameter is a parameter that relates to amount of mismatch between an antenna and a feed line connecting to it. VSWR is one example of such antenna parameter, but embodiments of present disclosure are applicable for other similar antenna parameters, too. Embodiments suit well for determining so called minor VSWR threshold for antennas.

It is to be noted that in the following, mainly antenna performance parameter of a single antenna is discussed, but clearly the same may be repeated for a plurality of antennas in parallel or sequentially one after another.

For the sake of clarity, it is noted that in this disclosure, the term "a default antenna performance parameter threshold value" is used interchangeably with the term "a default value of the antenna performance parameter threshold", and the term "a second antenna performance parameter threshold value" is used interchangeably with the term "a second value of the antenna performance parameter threshold", and the term "triggering antenna performance parameter threshold value" is used interchangeably with the term "a triggering value of the antenna performance parameter threshold".

Figure 1:
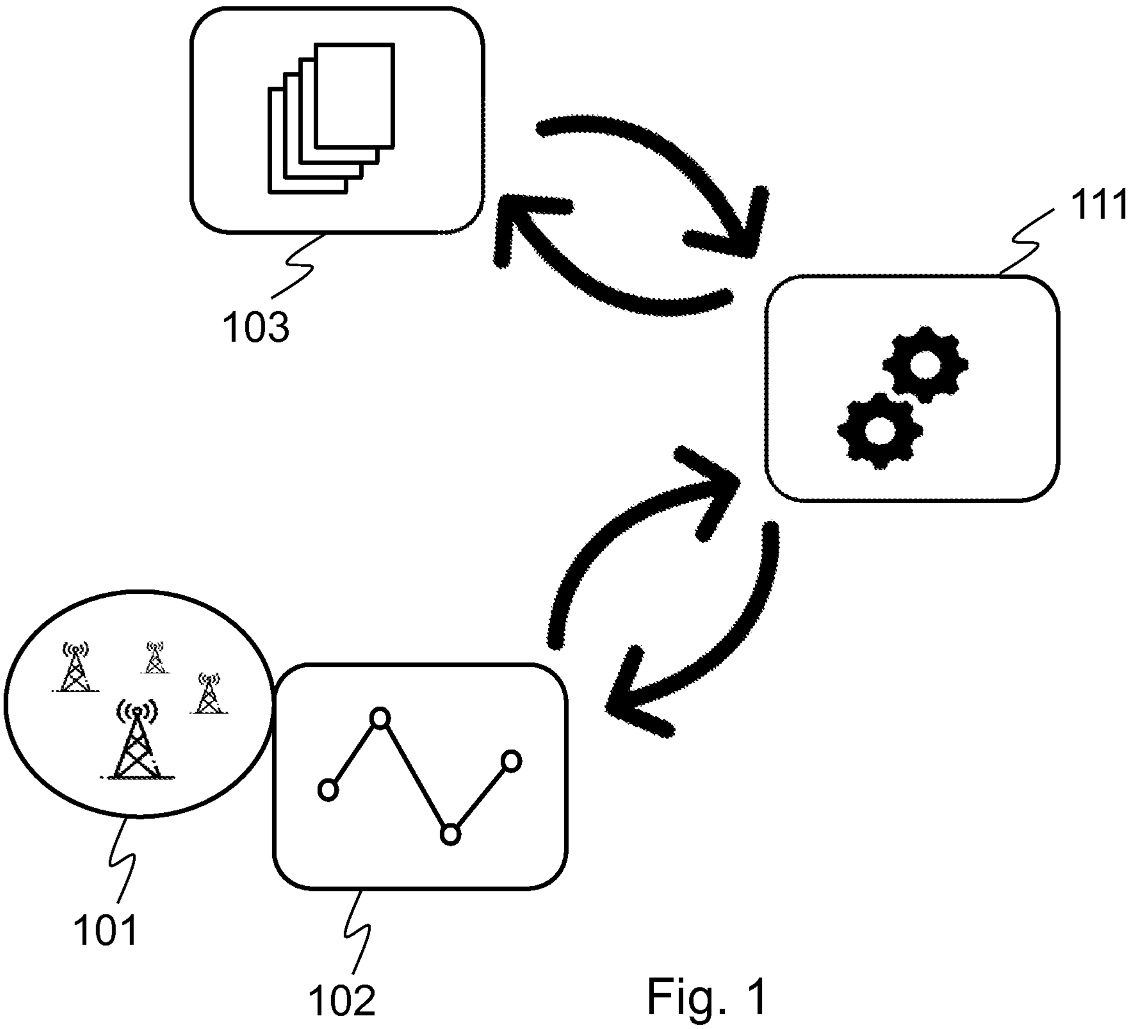
FIG. 1 shows an example scenario according to an embodiment.

FIG. 1 shows an example scenario according to an embodiment. The scenario shows a communication network 101 comprising a plurality of cells and base stations and other network devices, and an operations support system, OSS, 102 that manages operations of the communication network 101. Further, the scenario shows a documentation system 103 configured to store information related to the communication network 101, and an automation system 111 configured to implement example embodiments. The documentation system 103 may store for example information about physical devices used in the communication network 101 and about structure of the communication network 101.

In an embodiment of the invention the scenario of FIG. 1 operates as follows. The automation system 111 is operable to obtain information from the documentation system 103 and/or from the communication network 101 (e.g. through the OSS 102). In certain embodiments, the automation system is also operable to provide information to the documentation system 103 and/or to the communication network 101 (e.g. through the OSS 102).

The automation system 111 is operable to obtain a default antenna performance parameter threshold value of an antenna (i.e. a default value of the antenna performance parameter threshold) and to determine a second antenna performance parameter threshold value for the antenna (i.e. a second value or a new value of the antenna performance parameter threshold). The second antenna performance parameter threshold value is then taken into use for the antenna in the communication network 101.

The process may be manually or automatically triggered. The process may be periodically repeated. The process may be repeated for example once a month, every three months, every six months or over some other time period. By periodically repeating the process, effective network monitoring is achieved and problems, if any, may be timely detected. Additionally or alternatively, the process may be performed in connection with deployment of new antennas and/or in connection with maintenance actions performed in a base station site. In this way any antenna performance parameter threshold values relating to newly deployed antennas may be processed right away.

Figure 2:
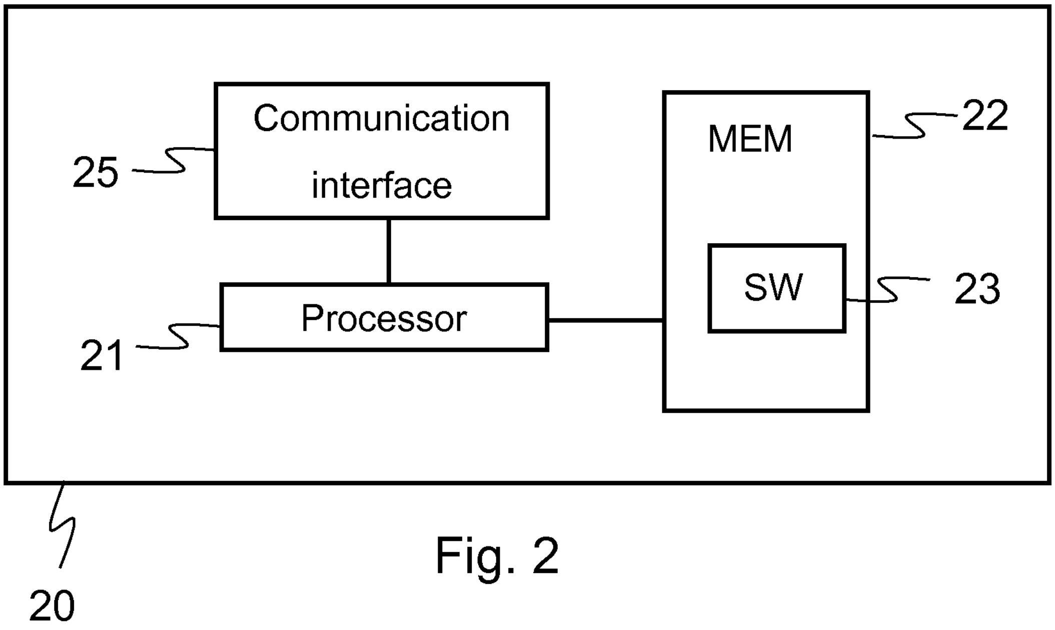
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the invention. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

Figure 3:
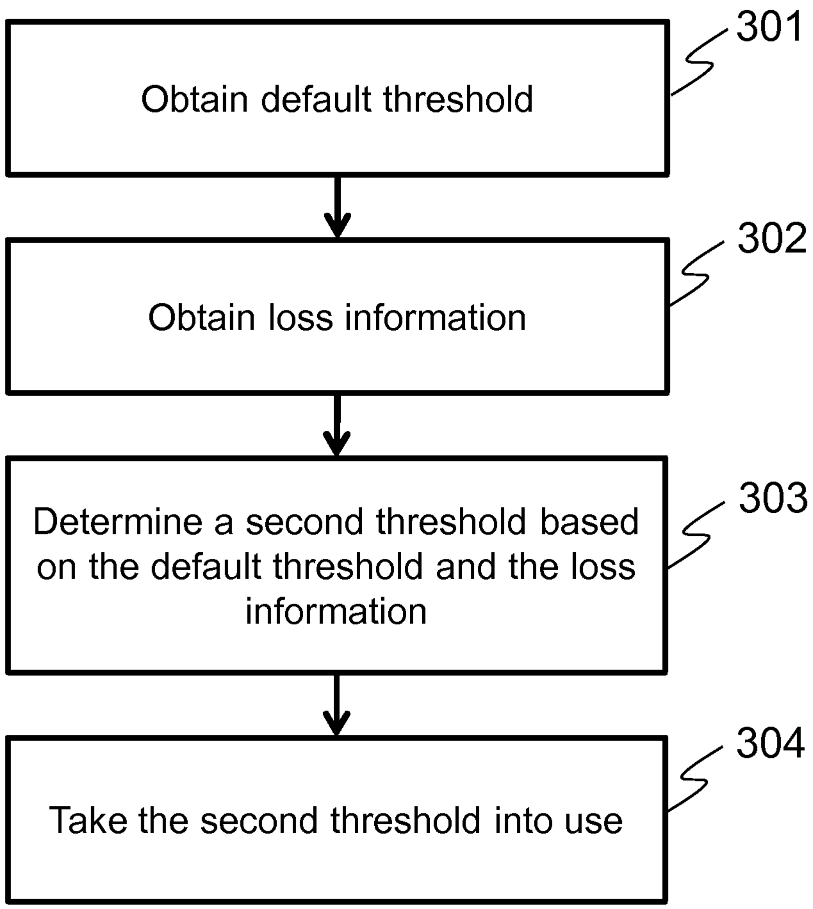
FIGS. 3 and 4 show flow diagrams illustrating example methods according to certain embodiments.
Figure 4:
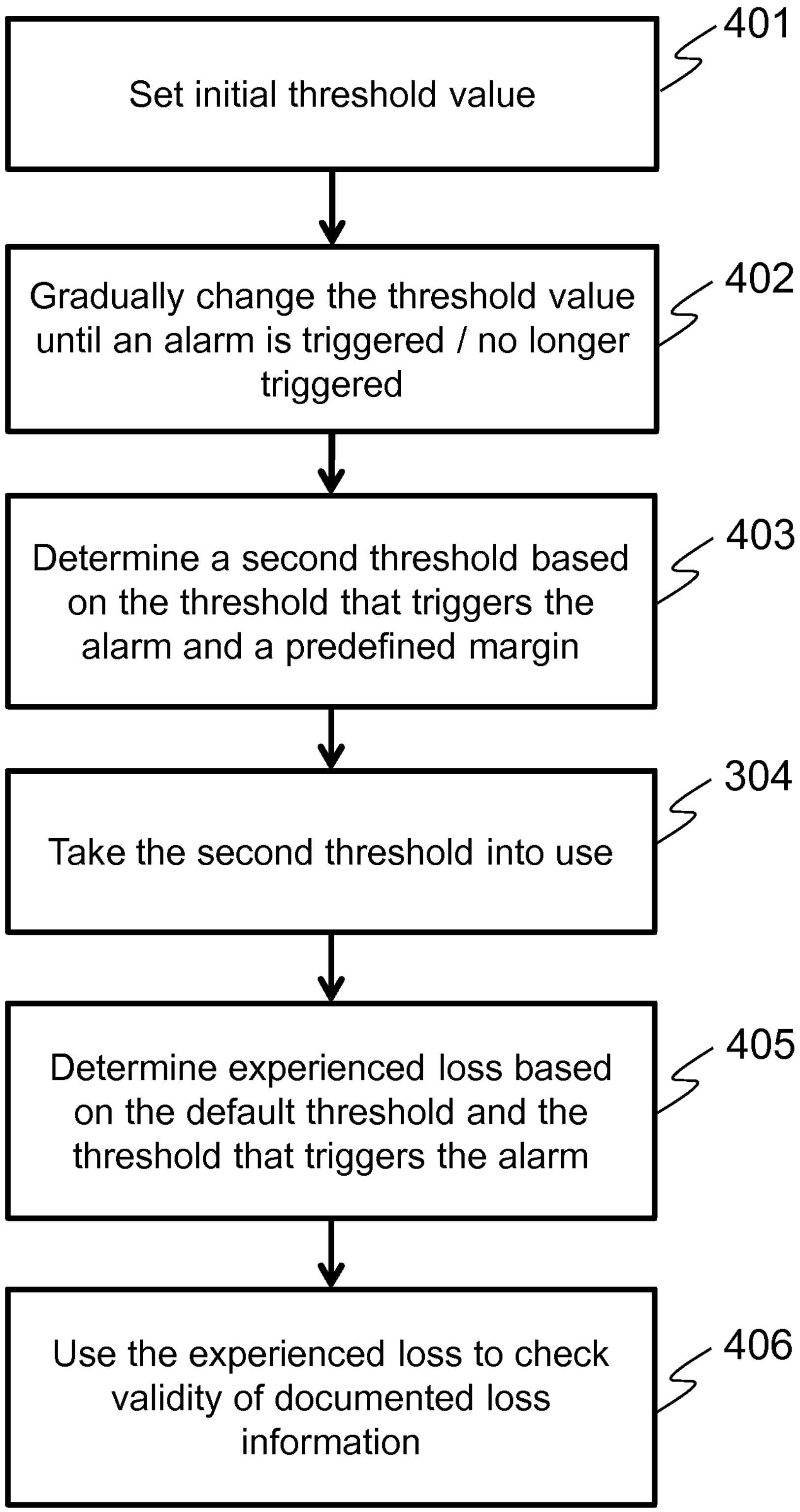

FIGS. 3 and 4 show flow diagrams illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIGS. 3 and 4 may be combined with each other and the order of phases may be changed except where otherwise explicitly defined. Furthermore, it is to be noted that performing all phases of the flow charts is not mandatory.

The method of FIG. 3 provides handling threshold value of an antenna performance parameter of an antenna of a telecommunication network. More specifically, the method of FIG. 3 provides adjusting the threshold value of the antenna performance parameter. The method comprises the following phases:

Phase 301: A default antenna performance parameter threshold value of the antenna is obtained. I.e. a default value is obtained. The default value may be obtained for example from the documentation system 103 of FIG. 1 and more particularly from documentation information provided by antenna manufacturer.

Phase 302: Loss information related to the antenna is obtained. The loss information may be obtained for example from the documentation system 103 of FIG. 1. The loss information may comprise for example information about cable losses and/or connector losses. Loss may vary depending on cable lengths, cable type, used connectors, used RF components and used frequency. Loss of different components in the antenna setup may be obtained for example from information provided by component manufacturer. Component documentation may readily provide the associated loss in dB or some calculation may be required. For example, if the losses vary depending on frequency, the phase 302 may include calculation of losses for the frequency that is being used.

Phase 303: A second antenna performance parameter threshold value for the antenna is determined based on the default antenna performance parameter threshold value and the loss information. I.e. a second or a new value is determined.

In an example embodiment, the determination is performed as follows. The default antenna performance parameter threshold value is transformed into default return loss. The following equations can be used for this purpose:

antenna performance parameter threshold value is denoted as VSWR reflection coefficient $r=(\text{VSWR}-1)/(\text{VSWR}+1)$ Return loss $\text{RL}=-20 \log 10(r)$ (return loss is given in dB).

Additional loss caused by the cables and connectors is calculated based on the information obtained in phase 302. The additional loss is subtracted from the default return loss to obtain compensated return loss. The additional loss is duplicated before the subtraction to take into account the path to the antenna and back from the antenna.

The compensated return loss is then transformed back to antenna performance parameter format e.g. based on the equations above to obtain the second antenna performance parameter threshold value.

Phase 304: The determined second antenna performance parameter threshold value is taken into use in the antenna. That is, the threshold value is adjusted. In practice, for example the automation system 111 of FIG. 1 may provision the determined second antenna performance parameter threshold value to the OSS 102 of FIG. 1.

The method of FIG. 4 provides further aspects of handling threshold value of an antenna performance parameter of an antenna of a telecommunication network, and comprises the following phases:

Phase 401: The antenna performance parameter threshold value of the antenna is set to an initial value. In an example, the automation system 111 of FIG. 1 provisions the initial value to the OSS 102 of FIG. 1. The initial value may be for example set to a very small value, such as 1.01, but other value can be used, too. In one option, the initial value may be the default value set by antenna manufacturer. In yet another alternative, a relatively large initial value may be used, such as 5. In an embodiment, the initial value is chosen so that an antenna performance parameter alarm is very likely not triggered with the initial value (a relatively small initial value). Alternatively, the initial value is chosen so that an antenna performance parameter alarm is very likely triggered with the initial value (a relatively large initial value).

Phase 402: The antenna performance parameter threshold value is gradually changed until an antenna performance parameter alarm is triggered or until performance parameter alarm is no longer triggered. The antenna performance parameter threshold value that triggers (or still triggers) the alarm is referred to as a triggering antenna performance parameter threshold value (i.e. a triggering value of the antenna performance parameter threshold). Depending on the initial value, the gradual change may be increasing the threshold value or decreasing the threshold value.

The gradual change may be a stepwise change for example in 0.01 steps. Also varying step size may be used for example so that first, larger steps are taken and then the steps are reduced to smaller steps.

After each change of the antenna performance parameter threshold value, the new value is provisioned to the antenna, e.g. through the OSS 102 of FIG. 1. Then the process waits a predefined period of time to see if the antenna performance parameter alarm is triggered. If the alarm is not triggered/still triggered a further change is made and the process is repeated until the alarm is triggered/no longer triggered.

Phase 403: A second antenna performance parameter threshold value is determined based on the triggering antenna performance parameter threshold value and a predefined margin. The predefined margin may be either added to the triggering antenna performance parameter threshold value or subtracted from the triggering antenna performance parameter threshold value to obtain the second antenna performance parameter threshold value. The purpose of the margin is to adjust the threshold to a value that does not trigger the alarm but is nevertheless sufficiently close to the threshold that does trigger the alarm. The margin may be for example the same as the stepwise change that is used in phase 402, that is, e.g. 0.01. In certain cases the margin may be 0, that is, margin is not mandatory.

Phase 304: The determined second antenna performance parameter threshold value is taken into use in the antenna. In practice, for example the automation system 111 of FIG. 1 provisions the determined second antenna performance parameter threshold value to the OSS 102 of FIG. 1.

The second antenna performance parameter threshold value that is determined based on gradually changing the threshold value can be used for analyzing actual losses experienced in the antenna setup.

Phase 404: Experienced loss related to the antenna is determined based on the default antenna performance parameter threshold value of the antenna and the triggering antenna performance parameter threshold value. The difference between these values is proportional to the experienced loss. The difference can be transformed into return loss using the equations discussed in connection with phase 303 of FIG. 3.

Phase 405: The determined experienced loss is used for checking validity of loss information in a documentation system. If the loss information obtained from documentation does not correspond to the experienced loss, there is likely an error in the documentation or in the physical setup of the antenna. The system may be set up to output an indication of an error situation in such case. Based on this, maintenance personnel can investigate the matter further.

The following discusses determination of the second antenna performance parameter threshold value in certain example cases.

Example 1

Cable loss=2.0 dB (obtained from documentation)

VSWR threshold set by manufacturer=1.5→corresponding return loss value=13.979 dB (calculated using the equations discussed in connection with phase 303 of FIG. 3)

The cable loss 2×2 dB is added to the return loss value→new return loss value=17.979 dB VSWR threshold that corresponds to the new return loss value is 1.29 (calculated using the equations discussed in connection with phase 303 of FIG. 3).

Based on these calculations, the VSWR threshold should be set to 1.29 instead of the original 1.5. Assuming that the cable loss value is correct, VSWR alarm should be triggered at VSWR value 1.29.

Example 2

Assumed cable loss is 2.0 dB and respectively calculated VSWR value is 1.29 as defined in example 1.

In order to check what is the actual experienced loss, VSWR threshold is automatically tested starting from an initial VSWR threshold value 1.01 (corresponding return loss is 46.064, calculated using the equations discussed in connection with phase 303 of FIG. 3). The VSWR threshold value is gradually increased from the initial value until VSWR alarm is triggered.

VSWR alarm is triggered at VSWR threshold value 1.21. Based on this and default VSWR value of the antenna it can be calculated that the actual cable loss is 3.23 dB instead of the assumed 2.0 dB (calculated using the equations discussed in connection with phase 303 of FIG. 3).

Without in any way limiting the scope, interpretation, or application of the claims appearing below, a technical effect of one or more of the example embodiments disclosed herein is increased accuracy in network and antenna monitoring as antenna specific antenna performance parameter threshold values (e.g. VSWR thresholds) can be used instead of antenna model specific thresholds.

Another technical effect of one or more of the example embodiments disclosed herein is ability to determine and use antenna performance parameter threshold values that correspond to individual set up. In this way, alarms triggered by the VSWR threshold are more accurate as the threshold is adjusted to match the specific setting in which the antenna operates. This in turn may result in improved optimization results and improved use of resources in telecommunication networks.

Yet another technical effect of one or more of the example embodiments disclosed herein is ability to detect documentation errors related to antenna cables and connectors.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A computer implemented method of handling a threshold value of an antenna performance parameter of an antenna of a telecommunication network, the method comprising:

setting the threshold value of the antenna performance parameter of the antenna to an initial value, wherein the antenna performance parameter comprises an amount of mismatch between the antenna and a feed line connecting to the antenna, and the threshold value is configured to trigger an antenna performance parameter alarm;

gradually changing the threshold value of the antenna performance parameter until the antenna performance parameter alarm is triggered, or until the antenna performance parameter alarm is no longer triggered, to find out a triggering value of the threshold of the antenna performance parameter;

determining a second threshold value of the antenna performance parameter based on the triggering value of the threshold of the antenna performance parameter and a predefined margin; and taking the second threshold value of the antenna performance parameter into use for the antenna.

2. The method of claim 1, wherein the initial value is a default value of the threshold of the antenna performance parameter.

3. The method of claim 2, wherein the default value is obtained from a documentation system.

4. The method of claim 2, wherein the default value is obtained from documentation information provided by an antenna manufacturer.

5. The method of claim 1, further comprising determining an experienced loss related to the antenna based on a default value of the threshold of the antenna performance parameter of the antenna and the triggering value of the threshold of the antenna performance parameter threshold.

6. The method of claim 5, further comprising using the determined experienced loss to check validity of loss information in a documentation system.

7. The method of claim 1, wherein the antenna performance parameter is a Voltage Standing Wave Ratio, VSWR, parameter.

8. An apparatus comprising a processor and a memory including computer program code; the memory and the computer program code configured to, with the processor, cause the apparatus to:

handle a threshold value of an antenna performance parameter of an antenna of a telecommunication network, wherein the antenna performance parameter comprising an amount of mismatch between an antenna and a feed line connecting to the antenna, and the threshold value is configured to trigger an antenna performance parameter alarm;

set the threshold value of the antenna performance parameter of the antenna to an initial value;

gradually change the threshold value of the antenna performance parameter until the antenna performance parameter alarm is triggered, or until the antenna performance parameter alarm is no longer triggered, to find out a triggering value of the threshold of the antenna performance parameter;

determine a second threshold value of the antenna performance parameter based on the triggering value of the threshold of the antenna performance parameter and a predefined margin; and take the second threshold value of the antenna performance parameter into use for the antenna.

9. A non-transitory computer readable medium comprising computer executable program code which when executed by a processor causes an apparatus to:

handle a threshold value of an antenna performance parameter of an antenna of a telecommunication network, wherein the antenna performance parameter comprising an amount of mismatch between an antenna and a feed line connecting to the antenna, and the threshold value is configured to trigger an antenna performance parameter alarm;

set the threshold value of the antenna performance parameter of the antenna to an initial value;

gradually change the threshold value of the antenna performance parameter until the antenna performance parameter alarm is triggered, or until the antenna performance parameter alarm is no longer triggered, to find out a triggering value of the threshold of the antenna performance parameter;

determine a second threshold value of the antenna performance parameter based on the triggering value of the threshold of the antenna performance parameter and a predefined margin; and take the second threshold value of the antenna performance parameter into use for the antenna.

* * * * *